United States Patent [19]
Garcia

[11] Patent Number: 5,851,099
[45] Date of Patent: Dec. 22, 1998

[54] ADJUSTABLE CARGO PLATFORM ASSEMBLY

[75] Inventor: Anibal Garcia, Mira Loma, Calif.

[73] Assignee: McDonnell Douglas Corporation, Huntington Beach, Calif.

[21] Appl. No.: 702,822

[22] Filed: Aug. 23, 1996

[51] Int. Cl.$^6$ .................................................. B65G 65/00
[52] U.S. Cl. ...................... 414/398; 414/498; 414/390; 14/71.7; 244/137.1
[58] Field of Search ..................................... 414/390, 395, 414/532, 533, 392, 398, 534, 535, 525.9, 498; 193/35 R, 44, 42, 35 MD; 248/659, 652, 660, 913; 198/750.2, 773; 269/55, 58, 289 MR; 14/71.7, 71.3, 69.5; 244/137.1

[56] References Cited

U.S. PATENT DOCUMENTS

| | | | |
|---|---|---|---|
| 2,547,460 | 4/1951 | Hamilton, Jr. | 14/71.7 |
| 2,689,965 | 9/1954 | Fenton | 14/71.7 |
| 3,138,812 | 6/1964 | Presser | 14/69.5 X |
| 3,179,968 | 4/1965 | Lambert | 14/71.7 |
| 3,235,895 | 2/1966 | Wallace et al. | 14/71.7 |
| 3,913,757 | 10/1975 | Lorey | 414/401 X |
| 4,235,399 | 11/1980 | Shorey . | |
| 4,544,319 | 10/1985 | Folling et al. . | |
| 4,860,973 | 8/1989 | Fenner . | |
| 5,014,935 | 5/1991 | Dalbera . | |
| 5,219,259 | 6/1993 | Cochran et al. | 414/535 X |
| 5,241,722 | 9/1993 | Rohrlick et al. . | |

FOREIGN PATENT DOCUMENTS

| | | | |
|---|---|---|---|
| 56934 | 4/1983 | Japan | 298/17.6 |
| 2010205 | 6/1979 | United Kingdom | 193/35 R |

*Primary Examiner*—Frank E. Werner
*Attorney, Agent, or Firm*—Bell Seltzer Intellectual Property Law Group of Alston & Bird LLP

[57] ABSTRACT

This invention relates to a ramp design permitting the positioning of a cargo ramp floor at any angle or height, which is integral with the aircraft such that it can be aligned to a vehicle transferring the load. The adjustable cargo platform assembly and the automated platform leveling system permits the ramp and ramp platform to be raised or lowered, but also permits the ramp platform to be tilted about a roll axis and aligned laterally with the floor of the load carrying vehicle to allow the cargo to be transferred to the aircraft. Efficient on-loading and off-loading of a palletized loading system (PLS) flatrack, directly off a PLS truck is achieved by such alignment. Actuators in the forward end of the ramp lift the platform as it rotates about the aft hinge point until the platform is even with the bottom of flatrack. After the platform has been lifted so that it is substantially parallel with the longitudinal axis of truck bed, roll actuators are used to raise and rotate the upper section of the platform about the longitudinal access of the ramp to match the plane of the truck bed. The roll alignment feature uses two selectable hinge locations located at the outer ends of the platform structure. Two sets of over center hooks initially lock down both sides of the upper platform structure to the platform frame. This permits the opposite side to be released and lifted using the opposite lock down side as a hinge. The cargo ramp floor may be outfitted with the various cargo rails and roller systems currently in use and the platform is not limited to any specific cargo handling system.

20 Claims, 8 Drawing Sheets

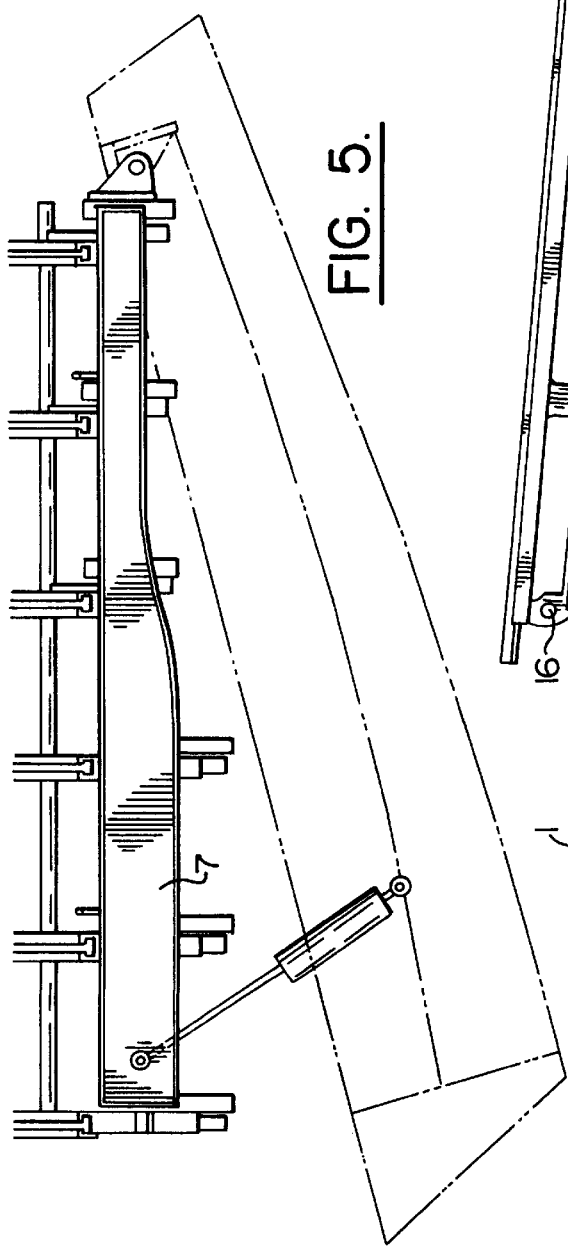
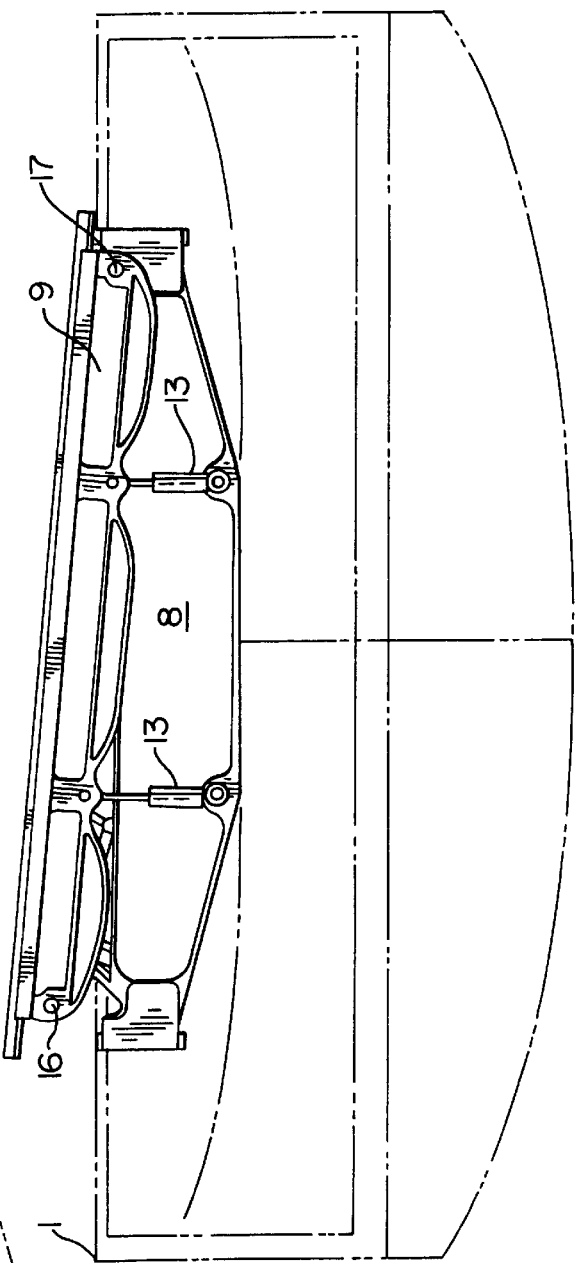
FIG. 5.
FIG. 6.

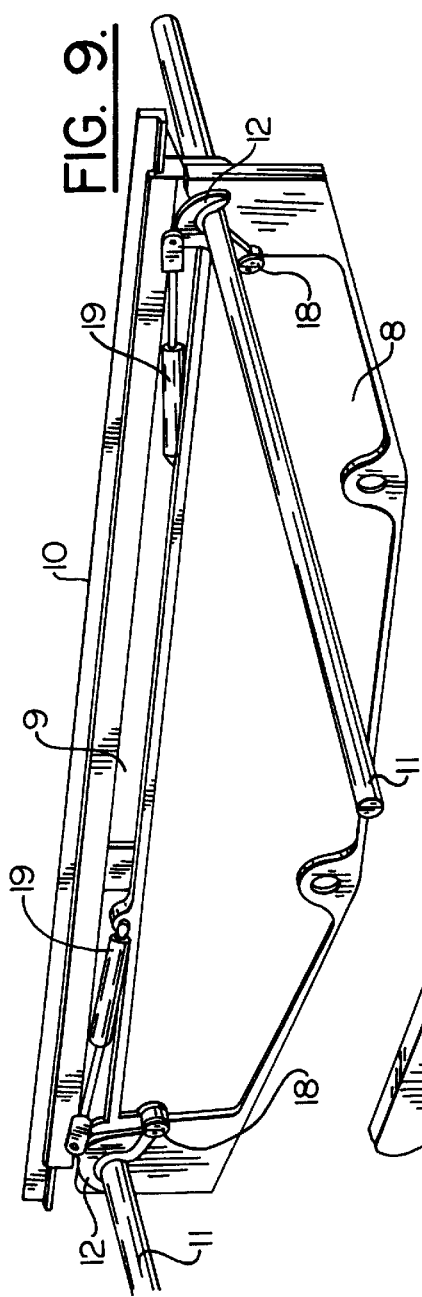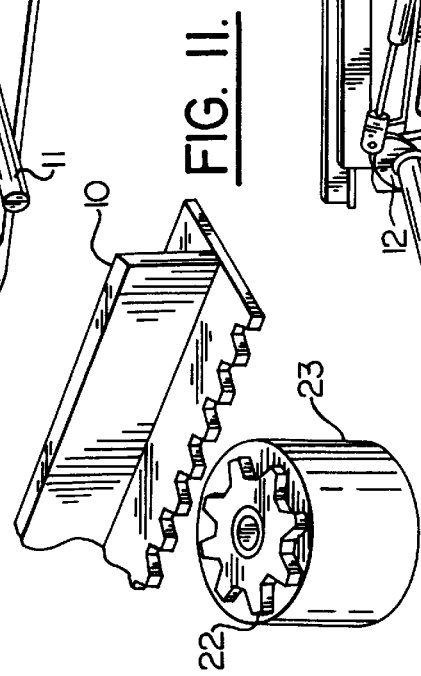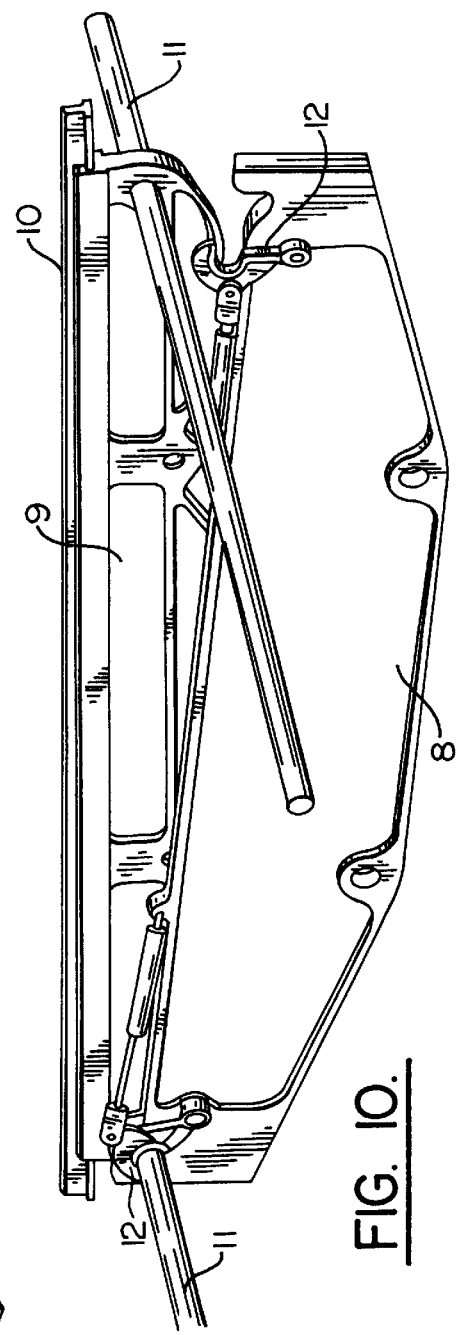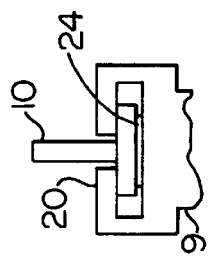

ADJUSTABLE CARGO PLATFORM ASSEMBLY

BACKGROUND OF THE INVENTION

1. Field of the Invention

The field of this invention involves cargo transfer systems and cargo supporting ramps. More specifically, this invention involves the adjustment of cargo ramps to meet cargo vehicle positions or to receive and transfer cargo loads in aircraft.

2. Related Art

The current ramp design for cargo aircraft currently permits a lowering of a cargo ramp to the level of the cargo floor, thereby permitting transfer of cargo to the cargo ramp utilizing heavy ground based material handling equipment or what is known as the K-loader to pick up cargo and place it on the cargo ramp, thereby allowing transfer to the cargo floor inside the aircraft. Current cargo ramps on transport aircraft are not capable of adjusting themselves to various positions that may be required when the aircraft is positioned on something other than a flat runway to ensure appropriate positioning between the aircraft, the cargo ramp and the cargo transport vehicles to off-load or on-load cargo.

Current practice requires ground based material handling equipment support, which is in short supply and which utilizes heavy equipment which must be transported by air. Thus such heavy material handling equipment may and usually is not available at austere forward bases. Ground base material handling additionally require skilled personnel to operate the machinery. Cargo handling with ground based material handling equipment is inefficient because the cargo is double transferred, with ground based equipment always interfacing between the cargo transferring vehicles and the transport aircraft. Currently, when cargo of this nature needs to be transported, the entire truck loaded with a flatrack is driven onto the aircraft, and then transported. While this permits the movement of the cargo, the height of the load is restricted and cargo weight limits are reached with a smaller load because the transport vehicle's weight must also be transported.

This minimizes the actual cargo transport capability of the aircraft because the truck utilizes weight and cargo space that could be used to transport additional cargo. The capability of loading only the flatrack or Land/Sea container without the transport truck permits more cargo area and weight capacity to be made available thus making more efficient use of the aircraft and its entire cargo area.

BRIEF DESCRIPTION OF THE INVENTION

The ramp design of the instant invention permits positioning of the cargo ramp floor which is integral with the aircraft at any angle or height, such that it can be aligned to a vehicle transferring the load. Current cargo ramps raise and lower about a single hinge line at the forward attachment port of the ramp and a second hinge line at the aft end of the ramp for the ramp platform. The adjustable cargo platform assembly and the automated platform leveling system permits the ramp and ramp platform to be raised or lowered, but also permits the ramp platform to be tilted about a roll axis and aligned laterally with the floor of the load carrying vehicle to allow the cargo to be transferred to the aircraft. For example, the current invention allows the Load Master to efficiently on-load and off-load a palletized loading system (PLS) flatrack, directly off a PLS truck by permitting proper alignment of the tracks of the cargo ramp and the PLS truck. The PLS truck and flatrack are U.S. Army heavy transport vehicles that are currently part of the U.S. Army inventory.

The platform may be controlled from a remote system such as a Load Master Station, accessible from inside or outside the aircraft. Less manpower is required to operate the equipment and therefore a lower operational cost for aircraft load conveyance is enjoyed. The speed of transfer is improved so that the aircraft is exposed to threats while on the ground for a shorter period of time. In a commercial application, lower labor and loading dock usage results in considerable cost savings. High speed transfer also improves the utilization and productivity of the aircraft and the instant design does not compromise any of the current features of the transport aircraft. The invention incorporates a multi-adjustable cargo platform integrated into the cargo ramp. It can be adjusted using an Automated Platform Leveling system to level off and interface with any load vehicle loading or unloading either container or palletized loads from trucks or flatracks which may move directly off the PLS truck bed.

To unload a PLS flatrack from a PLS truck, the ramp is lowered to the height of the PLS truck bed (that is, where the flatrack is mounted to the PLS truck). The actuators in the forward end of the ramp lift the platform as it rotates about the aft hinge point until the platform is even with the bottom of the flatrack. After the platform has been lifted so that it is substantially parallel with the longitudinal axis of the truck bed, roll actuators are used to raise and rotate the upper section of the platform about the longitudinal axis of the ramp to match the plane of the truck bed. The roll alignment feature of the invention uses two selectable hinge locations located at the outer ends of the platform structure. Two sets of over center hooks initially lock down both sides of the upper platform structure to the platform frame. This permits the opposite side to be released and lifted using the opposite lock down side as a hinge.

Once the cargo platform plane matches the bottom plane of the flatrack, the platform may be aligned laterally with the rails on the bottom of the flatrack. A lateral alignment system may use a track like structure driven by a rack and pinion gear system that permits movement of the platform floor left and right laterally with respect to the aircraft for final alignment. This permits adjustment of the cargo platform to compensate for any mispositioning of the PLS truck carrying the load when it backs into the cargo transferring position. It should be understood that the adjustable cargo platform described is positioned below the floor of the cargo ramp which is mounted on top of the lateral rails. This floor may be outfitted with the various cargo rails and roller systems currently in use. These include, for example the fixed mounted roller carriers and automated power roller systems. However, the platform is not limited to any specific cargo handling system and the adjustable cargo platform assembly is designed to accommodate various types of rollers, tracks, locks, tie downs and other cargo handling fixtures typically used in the art.

The range of adjustment with respect to the various structures is restricted only by its various applications and adjustments in the degree and amount of rotation and tilting or lateral movement can be designed to adjust to any cargo transfer vehicle. The instant configuration permits the handling of cargo from any type of transporter without the necessity of reconfiguring to handle any specific dedicated type of transporter. The use of this design may be used with commercial cargo transport aircraft, marine and warehousing loading docks and in the trucking industry generally and is not intended to be restricted to a cargo aircraft. The adjustable cargo platform may also be incorporated into current truck cargo handling systems which would permit the ability to transfer cargo from a truck to a cargo dock or other truck, etc.

It is an object of this invention therefore to provide a cargo platform that can be positioned parallel to the truck bed of a cargo transport vehicle when loading and unloading cargo.

It is a further object of this invention to equip aircraft cargo ramps with an adjustable cargo platform.

It is a further object of this invention to provide a cargo ramp which has multiple hinge and rotation points to adjust to cargo loading and unloading equipment.

A further object of this invention is to provide a cargo ramp structure which has lateral movement to adjust for cargo vehicle position.

It is a further object of this invention to provide a ramp structure which accepts loads at a broad range of heights and angles.

It is a further object of this invention to align cargo ramps to truck heights, trailer heights, cargo docks to transport vehicle beds or cargo floors.

It is a further object of this invention to allow aircraft to load PLS flatracks without the use of any ground based material handling equipment.

BRIEF DESCRIPTION OF THE DRAWINGS

FIG. 5 is a side view of the cargo ramp and the cargo platform in a horizontal position relative to the ground.

FIG. 6 is a view of the roll actuators positioning the platform floor into alignment.

FIG. 9 is a view of the hook actuators and the roll frame in a launch position.

FIG. 10 shows one side of the locking mechanism in an unlocked position.

FIG. 11 shows the rack and pinion driving structure for lateral elements.

FIG. 12 shows the channel guide for the lateral elements.

PREFERRED EMBODIMENT OF THE INVENTION

Figure 1:
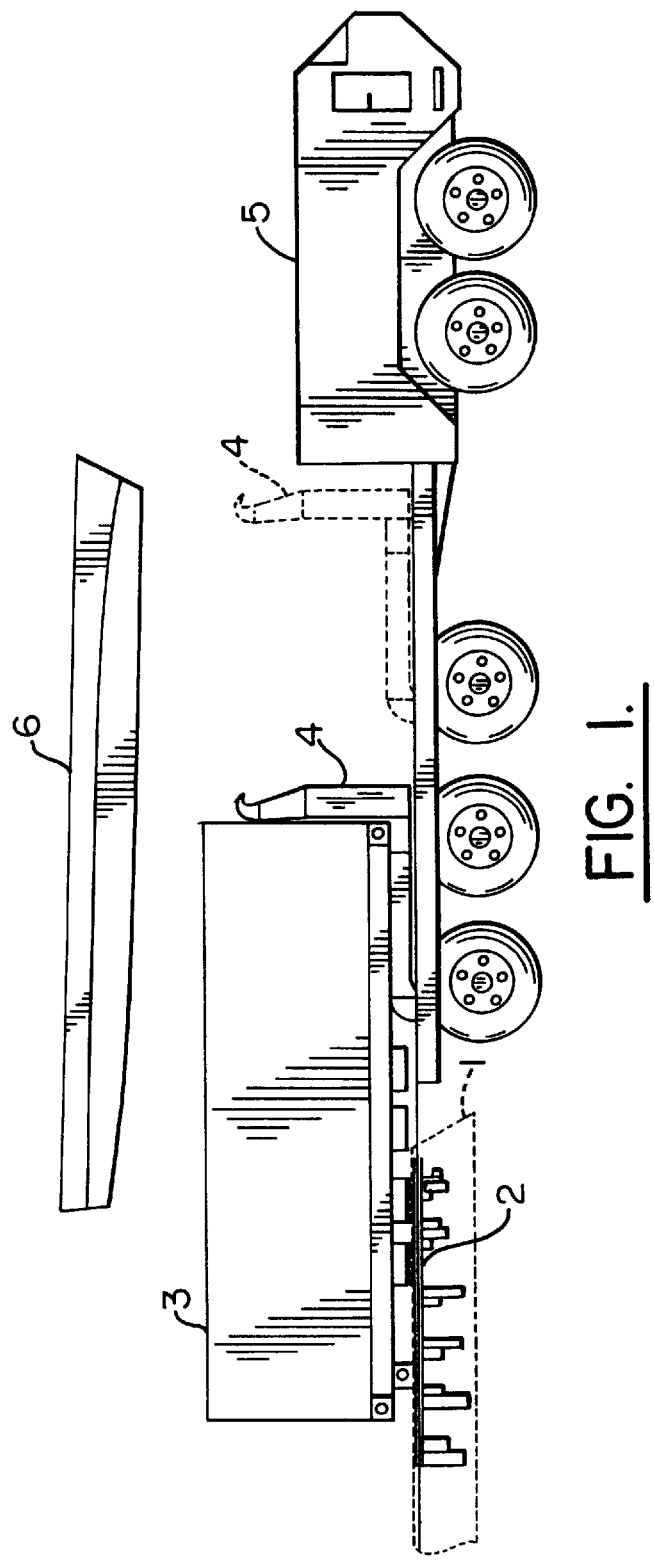
FIG. 1 is a side view of the PLS truck and position with a load moving to the cargo ramp.

Referring to FIG. 1, FIG. 1 shows a cargo ramp in dashed form, Cargo Ramp 1 in dashed outline, supporting an adjustable cargo ramp assembly 2, receiving a cargo container 3, using a PLS flatrack 4, to move the container which scans weigh up to 33,000 pounds. Also outline is a PLS truck vehicle 5, for carrying the PLS flatrack and container. The truck is positioned below an aircraft cargo door 6, in full open position. The truck has backed into the rear of the aircraft to position the load.

Figure 2:
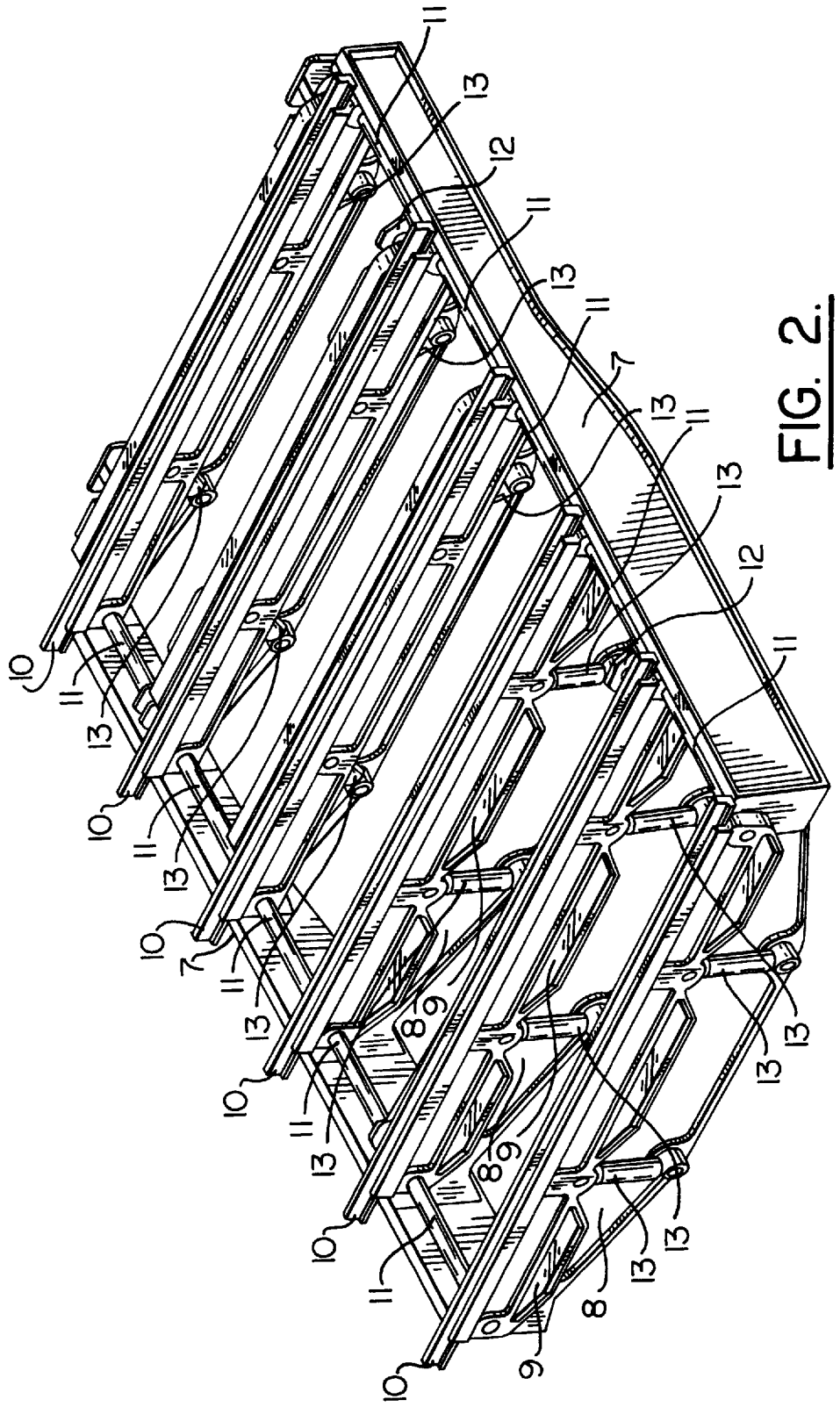
FIG. 2 is an isometric view of the cargo platform assembly moving from the forward position to the aft position on the right.

Referring to FIG. 2, the adjustable cargo platform structure includes a pair of side rails 7, to which are connected a plurality of transfer supporting members 8. It should be noted that the side bars are wider towards one end than towards the other, which when used with aircraft simply permits the structure to be accommodated in the ramp structure itself. However, in other embodiments the side members simply need to be of sufficient strength to support whatever loads are placed upon it without regard to any specific shape. Mounted above each of the transverse members 8 are a plurality of transverse roll members 9 which support a plurality of transverse members 10 which are adapted to moved by rack and pinion arrangement along the longitudinal axes of such roll members. The roll members are connected by a pair of rods 11 on either side of the transverse roll members forming a roll frame. Transverse roll frame is locked to the platform frame by locking hooks 12 at least two hooks on each side are shown for stability, although more or less of these hooks could be used to lock the roll frame in place depending upon the particular application. A plurality of hydraulic actuators 13 are shown mounted between the transverse members of the cargo platform and the transverse members of the roll frame. In operation, the hooks may be released on one side of the cargo platform and the actuators may be activated to raise the released side of the platform thereby rotating the roll frame relative to the longitudinal axis of the aircraft or in a general roll movement. This would allow alignment of the floor of the cargo platform with any vehicle should the roll position of the aircraft differ from that of the cargo vehicle. Alternatively, the other side of the cargo platform may be released thereby permitting roll in the opposite direction.

Figure 3:
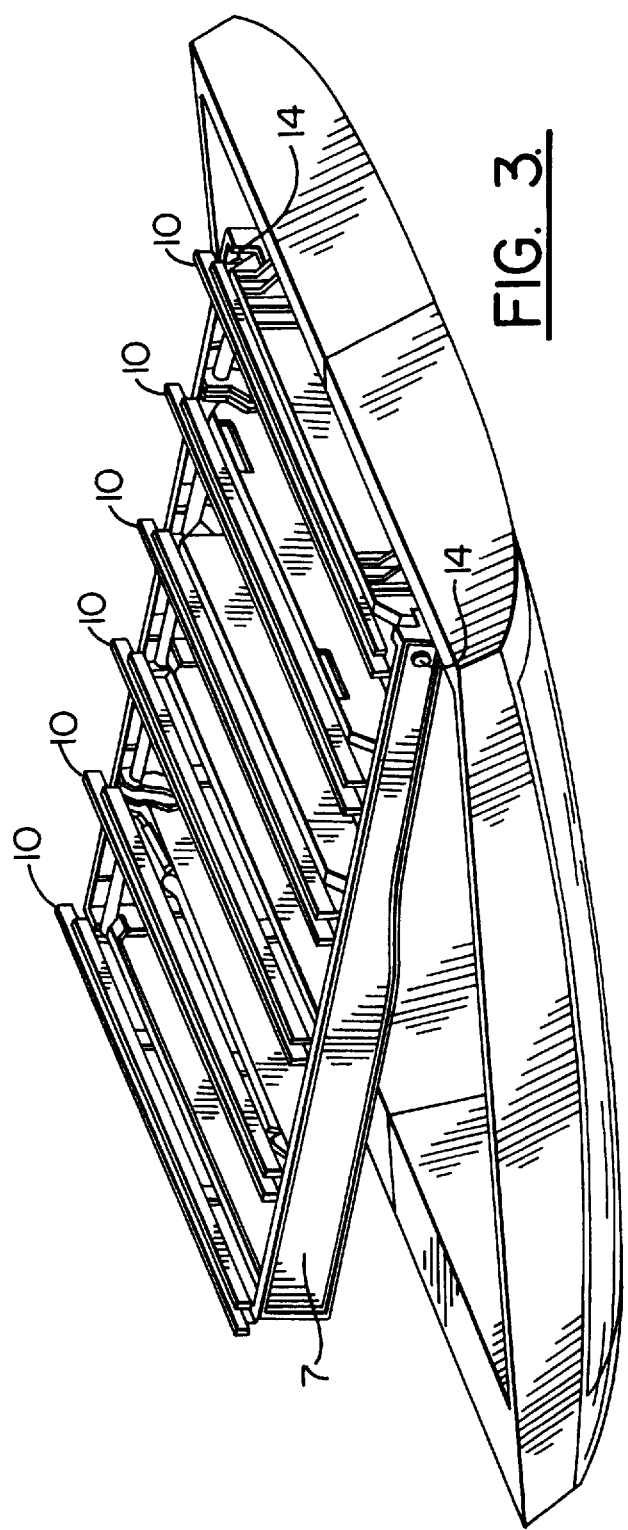
FIG. 3 is a view of the cargo platform tilted up from the cargo ramp.

FIG. 3 shows the cargo platform assembly and illustrates that the platform is attached to the cargo ramp at a hinge point 14. FIG. 5 shows a side view along with the hydraulic actuator 15.

Figure 4:
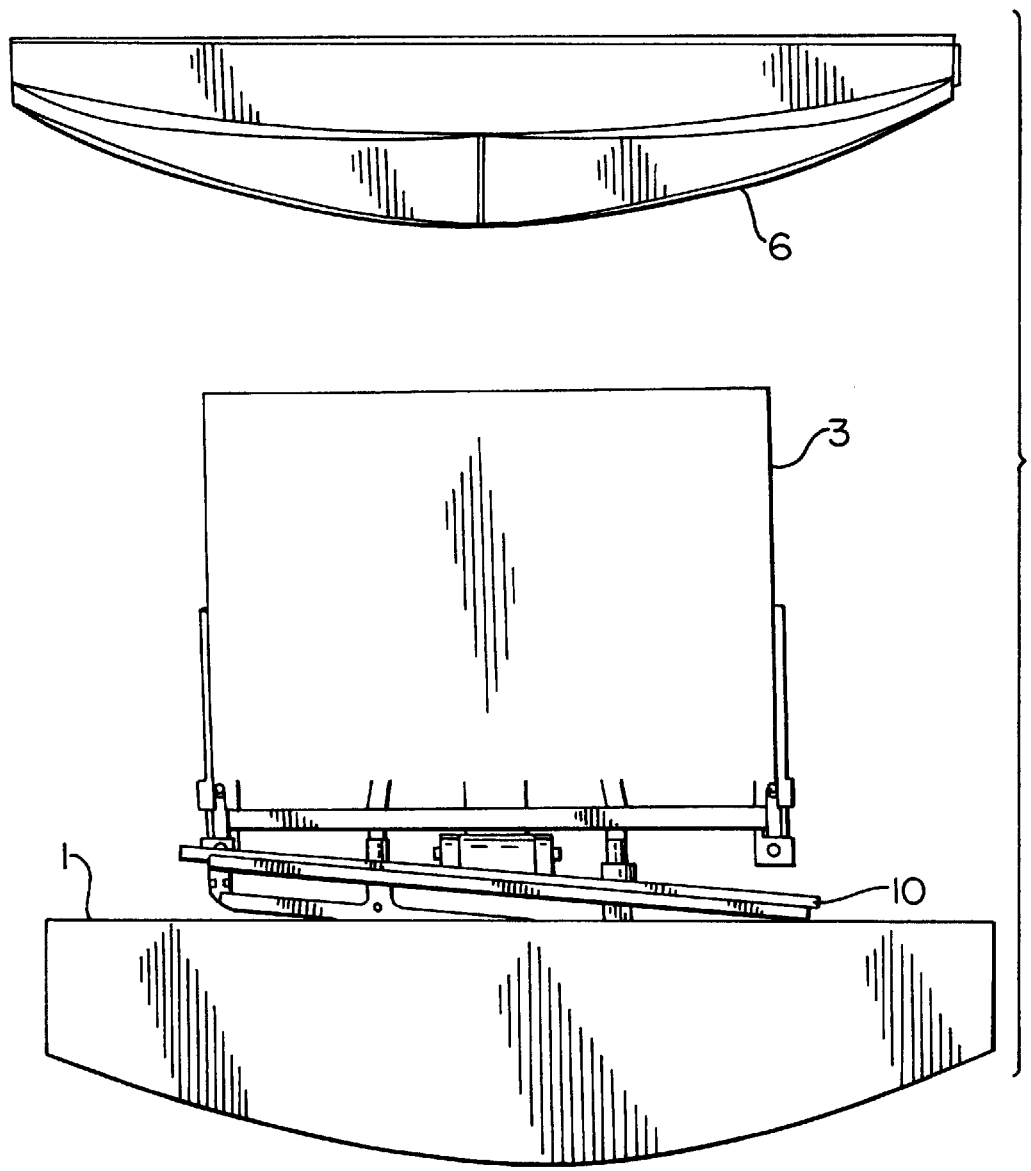
FIG. 4 is a view of the cargo container mounted on the PLS flatrack, with the cargo platform being adjusted into a position parallel with a PLS flatrack.

FIG. 4 shows the cargo door 6 in the open position looking aft to view a container 3 ready to be loaded. The dotted line shows the cargo ramp 1 with the cargo platform in the process of being adjusted. In FIG. 4, the left side looking aft is being raised to the bed of the PLS flatrack. In this particular case, the ramp and ramp platform will also need to be lifted to position the floor of the cargo platform substantially parallel to the bed of the transport vehicle to align the PLS flatrack.

FIG. 5 shows a more detailed view of the hinge point 14 with the cargo platform 2 held in a level position by a forward hydraulic actuator (15).

FIG. 6 shows essentially the same view as FIG. 4 illustrated in detail showing pivot points 16 and 17 about locking rods 11 of the roll frame. In this particular case, the roll frame is rotating about pivot point 17 and one of the actuators 13 is extended to a greater degree than the other actuator 13 as would be expected. This view is one looking aft generally along the plane of the platform frame. The forward actuator 15 has been omitted from this view for clarity.

Figure 7:
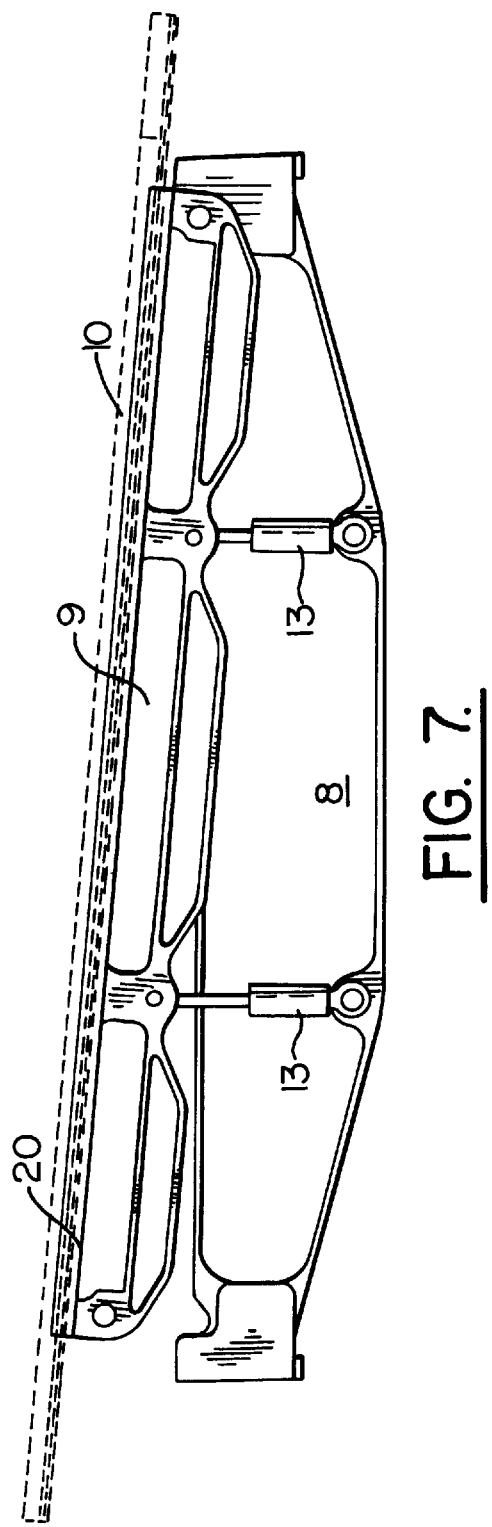
FIG. 7 is a view of one of the cargo roll elements showing the lateral movement structure.

FIG. 7 illustrates the motion of the lateral elements of the roll frame 9 illustrating the various positions relative to the roll frame structure. The degree of movement laterally will depend upon the size of the ramp of the aircraft and the particular application. Each of the lateral elements 10 is received by a channel 20 which is mounted on the top of the roll members 9.

As shown in FIG. 11, the lateral elements 10 are generally an inverted T shaped structure having a plurality of teeth 21 along one side thereof. The teeth 21 engage a gear (22 driven by a reversible electric motor 23) mounted on the roll frame. Energizing the motor 23 drives the lateral elements through the engagement of the gear 22. The teeth 21 and the gear 22 form a rack and pinion structure which may be driven in either direction and converts the rotational motion of the motor 23 to linear motion of the lateral elements 10.

Referring to FIG. 12, the lateral element 10 is received by a channel guide 20. The lateral element 10 is provided with roller bearings 24 which permits the lateral element 10 to freely move through the channel guide 20. Any particular mounting is satisfactory which permits lateral motion of the lateral element.

Other driving elements may be used for lateral motion such as hydraulic actuators and the like as is well known in the art. However, since the driving element will be used only to move the floor laterally and are not required to lift the entire load, a less robust mechanism such as the rack and pinion structure described may be used.

However, such devices must have sufficient power to move a loaded cargo platform laterally when alignment is required to off-load the cargo.

Figure 8:
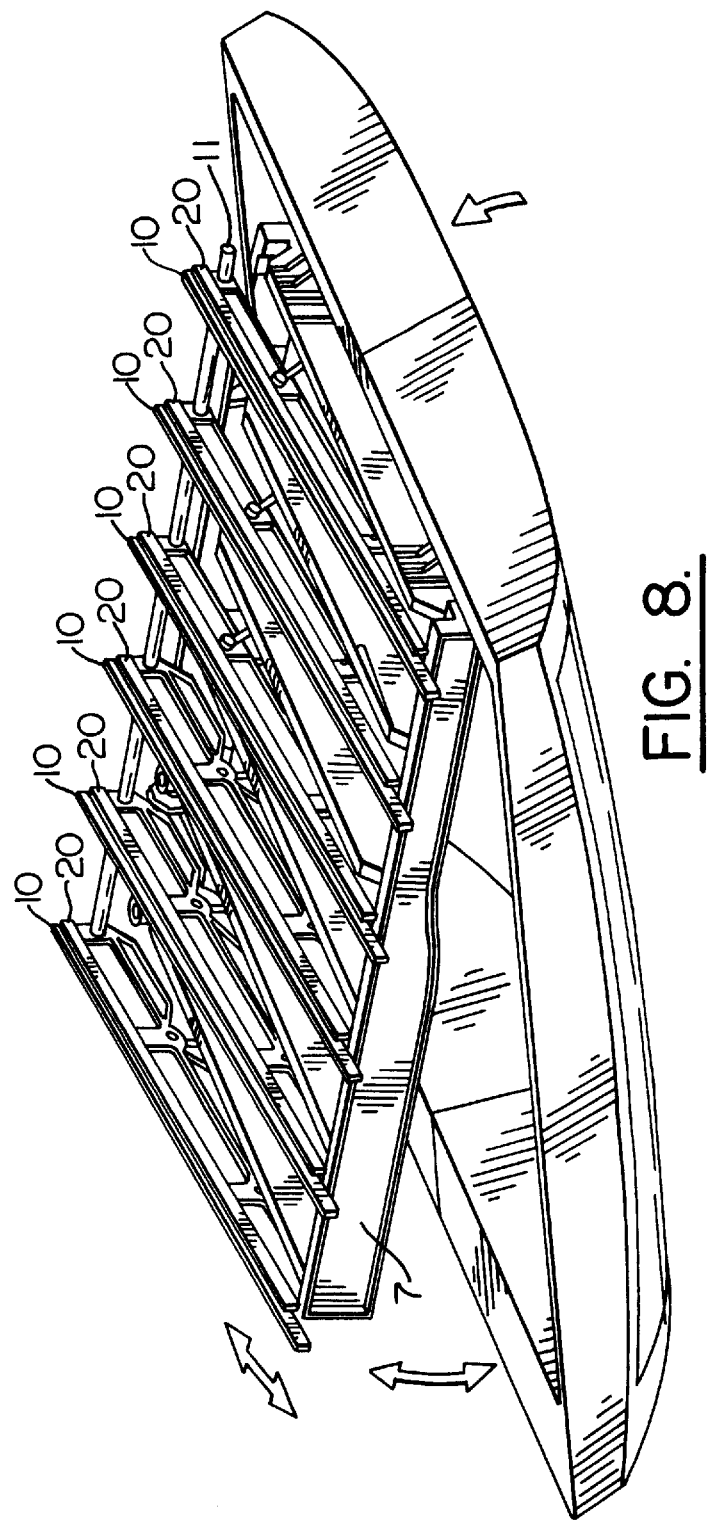
FIG. 8 shows the cargo platform after adjustment of the pitch, roll and lateral positioning thereof.

FIG. 8 illustrates the final position of the cargo ramp assembly after adjustments to meet the load being transferred. The cargo floor, including the cargo handling equipment mounted on the top of the lateral rails (10), supports cargo rails and roller systems currently in use including fixed mounted roller carriers and automated power roller systems.

However the platform is not limited to any specific cargo handling system and the adjustable cargo platform may accommodate various types of rollers, tracks, locks, tie downs and other cargo handling fixtures used in the art. In the preferred embodiment, the actuators and cargo platform structure must be capable of supporting the weight of ramp and cargo loads of approximately 33,000 pounds.

FIG. 8 illustrates the lateral structure disposed to the left of the aircraft, the roll frame has been tilted upward on the left hand side and the cargo platform frame has been tilted in a pitch direction by lifting the forward section of the platform so that alignment of the cargo platform may be accomplished in the pitch and roll directions as well as in the lateral direction, thereby permitting a cargo transport vehicle to generally position itself behind the aircraft for loading and permitting the cargo platform to adjust itself to the relative position of the cargo transport vehicle.

Referring now to FIG. 9, detail is shown with regard to the hook locking mechanism. Each hook mechanism is rotatably attached to the platform transverse member 8 at a pivot point 18 and is maintained in a locked position by energizing hook actuators 19 which hold the hook in position over the bar 11 of the roll frame.

In FIG. 10, the right most hook locking mechanism is moved to the open position thereby releasing the rod 11 and permitting the transverse roll frame 9 to be rotated about the left most rod 11.

Having thus described the invention what is claimed is:

1. A cargo ramp assembly comprising:
    a. a cargo ramp capable of movement about a transverse axis at one end of said cargo ramp;
    b. a platform frame, having a longitudinal axis, rotatably mounted at one end to said cargo ramp, said platform frame adapted to rotate about said transverse axis independent of the movement of said cargo ramp;
    c. a roll frame movably mounted to said platform frame and adapted to move relative to the longitudinal axis of said platform frame; and
    d. at least one lateral frame member mounted to said roll frame adapted for lateral motion relative to said roll frame in a direction parallel to the transverse axis.

2. A cargo ramp assembly as described in claim 1 further comprising:
    a. means for selectively moving said platform frame about said transverse axis;
    b. means for selectively moving said roll frame about said longitudinal axis of said platform frame; and
    c. means for selectively moving said lateral frame member laterally with respect to said roll frame.

3. A cargo ramp assembly as described in claim 1 wherein said platform frame further comprises at least one locking mechanism for receiving at least one side of said roll frame and selectively locking said roll frame to said platform frame.

4. A cargo ramp assembly as described in claim 3 wherein said platform further comprises at least one actuator attached at one end to at least one side of said roll frame and at the other end to said platform frame for selectively moving said roll frame relative to said platform frame.

5. A cargo ramp assembly as described in claim 3 further comprising:
    a. means for selectively moving said platform frame about said transverse axis;
    b. means for selectively moving said roll frame about said longitudinal axis of said platform frame; and
    c. means for selectively moving said lateral frame member laterally with respect to said roll frame.

6. A cargo ramp assembly as described in claim 3 wherein said roll frame defines a central longitudinal axis, and wherein said platform frame further comprises at least two actuators attached at one end to said platform frame and attached at the other end to said roll frame and disposed on opposite sides of said central longitudinal axis of said roll frame.

7. A cargo ramp assembly as described in claim 1 wherein said platform frame further comprises at least two locking mechanisms disposed on opposite sides of said platform frame adapted for receiving opposite sides of said roll frame and selectively locking said opposite sides of said roll frame to said platform frame.

8. A cargo ramp assembly as described in claim 7 further comprising:
    a means for selectively moving said platform frame about said transverse axis;
    b. means for selectively moving said roll frame about said longitudinal axis of said platform frame; and
    c. means for selectively moving said lateral frame member laterally with respect to said roll frame.

9. A cargo ramp assembly comprising:
    a. a cargo ramp capable of movement about a transverse axis at one end of said cargo ramp;
    b. a platform frame, having a longitudinal axis and a plurality of transverse platform members, rotatably mounted at one end to said cargo ramp, said platform frame adapted to rotate about said transverse axis independent of the movement of said cargo ramp;
    c. a roll frame, having a plurality of transverse roll members, movably mounted generally in the same plane as said transverse platform members of said platform frame; and
    d. a plurality of lateral frame members slidably mounted to said roll frame adapted for selective lateral motion relative to said lateral frame in a direction parallel to the transverse axis.

10. A cargo ramp assembly as described in claim 9 further comprising:
   a. means for selectively moving said platform frame about said transverse axis;
   b. means for selectively moving said roll frame relative to said longitudinal axis of said platform frame; and
   c. means for selectively moving said lateral frame members laterally with respect to said roll frame.

11. A cargo ramp assembly as described in claim 9 wherein said platform frame further comprises at least one locking mechanism for receiving at least one side of said roll frame and selectively locking said roll frame to said platform frame.

12. A cargo ramp assembly as described in claim 11 wherein said platform frame further comprises at least one actuator attached to said roll frame for selectively moving said roll frame relative to said platform frame.

13. A cargo ramp assembly as described in claim 11 further comprising:
   a. means for selectively moving said platform frame about said transverse axis;
   b. means for selectively moving said roll frame about said longitudinal axis of said platform frame; and
   c. means for selectively moving said lateral frame member laterally with respect to said roll frame.

14. A cargo ramp assembly as described in claim 11 wherein said roll frame defines a central longitudinal axis, and wherein said platform frame further comprises at least two actuators attached at one end to said platform frame and attached at the other end to said roll frame and disposed on opposite sides of said central longitudinal axis of said roll frame.

15. A cargo ramp assembly as described in claim 14 further comprising:
   a. means for selectively moving said platform frame about said transverse axis;
   b. means for selectively moving said roll frame about said longitudinal axis of said platform frame; and
   c. means for selectively moving said lateral frame member laterally with respect to said roll frame.

16. An adjustable cargo platform assembly as described in claim 9 wherein said platform frame further comprises at least two locking mechanisms disposed on opposite sides of said platform frame adapted for receiving opposite sides of said roll frame and selectively locking said opposite sides of said roll frame to said platform frame.

17. A cargo ramp assembly comprising:
   a. a cargo ramp capable of movement about a transverse axis at one end of said cargo ramp;
   b. a platform frame, having longitudinal and rotational axes, rotatably mounted at one end to said cargo ramp, said platform frame adapted to rotate about said transverse axis independent of the movement of said cargo ramp;
   c. at least one pitch hydraulic cylinder mounted between said cargo ramp and said platform frame at a point spaced apart from said rotatably mounted point of said platform frame to said cargo ramp coupled to a hydraulic system;
   d. a roll frame defining a central longitudinal axis, said roll frame releasably mounted to said platform frame and adapted to rotate about said longitudinal axis of said platform frame;
   e. at least two actuators attached at one end to said platform frame and attached at the other end to said roll frame and disposed on opposite sides of the central longitudinal axis of said roll frame;
   f. a plurality of lateral frame members, slidably mounted to said roll frame, forming a lateral frame, each said lateral frame member having a plurality of teeth for engagement with a pinion forming a rack and pinion structure, each said lateral frame member adapted for lateral motion relative to said roll frame; and
   g. means for selectively driving said rack and pinion structure in either direction.

18. A cargo ramp assembly as described in claim 17 wherein said platform frame further comprises a plurality of longitudinal and transverse frame members forming said platform frame about said transverse axis.

19. A cargo ramp assembly as described in claim 18 wherein said roll frame further comprises a plurality of transverse roll members, each transverse roll member corresponding to a platform transverse frame member and each platform transverse frame member having a locking hook adapted for releasable engagement with said roll frame.

20. A cargo ramp assembly as described in claim 19 wherein said roll frame includes a plurality of mounting bars at least one of which is mounted on either side of said platform frame and disposed parallel to said rotational axis of said platform frame about said cargo ramp and adapted for coupling with said locking hook.

* * * * *